Feb. 28, 1933. A. H. WARTH 1,899,782
MATERIAL FOR FACING BOTTLE CAPS AND METHOD OF MAKING SAME
Filed Dec. 17, 1929
Fig. 1.
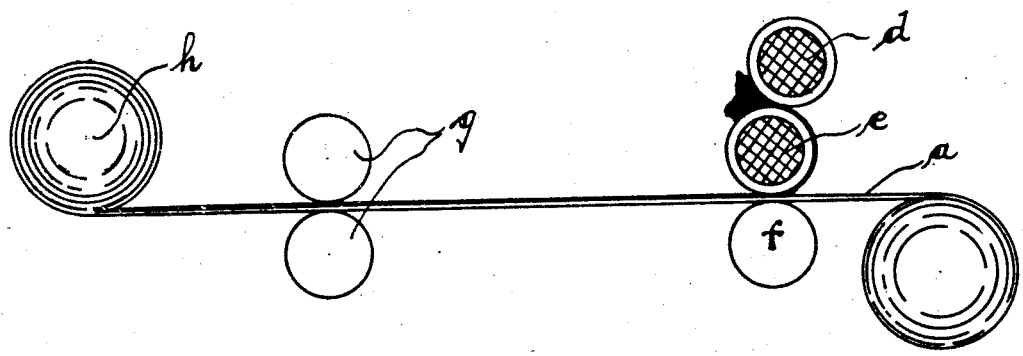
Fig. 2.
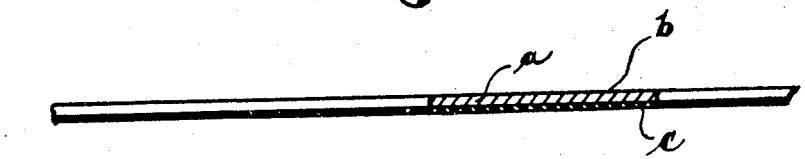
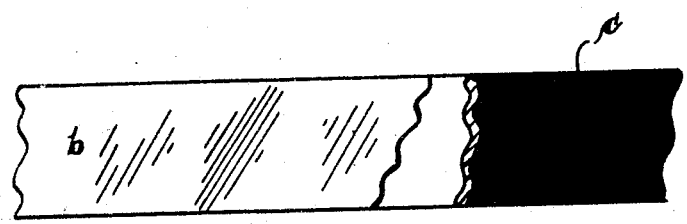
Fig. 3.

Patented Feb. 28, 1933

1,899,782

UNITED STATES PATENT OFFICE

ALBIN H. WARTH, OF BALTIMORE, MARYLAND, ASSIGNOR TO CROWN CORK & SEAL COMPANY, INC., OF NEW YORK, N. Y., A CORPORATION OF NEW YORK

MATERIAL FOR FACING BOTTLE CAPS AND METHOD OF MAKING SAME

Application filed December 17, 1929. Serial No. 414,614.

My invention relates to material for facing bottle caps and method of making same, and more particularly to strip material having applied to one face thereof a coating of gutta-percha.

This application is a continuation-in-part of my copending application Serial No. 494,201, filed November 7, 1930, the latter being a division of my application Serial No. 159,743, filed January 7, 1927, and now Patent No. 1,788,260, granted January 6, 1931.

Heretofore, facing material for bottle caps has been secured in position within the caps by means of gutta-percha tissue. In forming the facing disks and applying them to the caps, the practice has been to cut disks from superimposed strips of facing material and gutta-percha tissue, deposit the disks in the cap and apply heat for the purpose of fusing the gutta-percha tissue. Such a method is illustrated and described in my copending application Serial No. 492,546, filed October 31, 1930, as a division of my copending application Serial No. 360,895, filed May 5, 1929. As will be understood, this method of procedure is utilized in the production of caps of the "center spot" type, i. e. which are provided with a facing or "center spot" of less diameter than the cap or cushion disc within the cap. It is to the production of material for the manufacture of caps of this "center spot", that the present invention more particularly relates, although in its broader aspects it is useful in the manufacture of caps having facings other than "center spots". A further illustration of a cap of the "center spot" type is to be found in the patent to McManus 1.339,066, granted May 4, 1920. One difficulty in thus applying such "center spots" or disks to caps has arisen from the use of superimposed unconnected strips of facing material and of gutta-percha, the two strips being simultaneously fed from the same roll in relation to the punch of the face applying machine. As will be understood, facings of the "center spot" type are applied within the formed cap to the cushion liner and this method of manufacture presents problems quite distinct from the manufacture of caps having facings coextensive with the cushion liner, since facings coextensive with the cushion liner are ordinarily produced by adhesively uniting superimposed facing material and cushion liner material, both in sheet form, thereafter simply punching laminated discs of facing material and cushion material from the laminated sheet.

With this condition, there is not only difficulty in feeding the strip, but in cutting the gutta-percha with a clean sharp edge so as to ensure the binding stratum of gutta-percha being co-extensive in area with the facing disk. The gutta-percha binding stratum in such disks is intended not only to act as a cement, but also as a non-absorbent, gas impervious medium for avoiding possibility of the contents of a bottle getting between the facing disk and the material of the cap, either the metal shell itself or a cushion disk of cork or composition cork.

Furthermore, when thus using superimposed strips of the facing material and of gutta-percha tissue, it was essential, during the application of the disk to the cap, to bond the gutta-percha to both the material of the cap and the facing material.

It is desirable, in the use of facing disks of the character above referred to, that the gutta-percha stratum be as thin as possible, and yet be continuous throughout the entire area of the facing disk, and particularly that it be uninterrupted about the edge of this disk, since at this point the disk should be firmly bonded so as to effectively seal the joint about the edge of the facing disk. When cutting and applying the disks of paper and gutta-percha, there is no means of ascertaining whether the desired conditions are present in the completed cap. Consequently, there is always likelihood of imperfectly faced caps being produced.

With the above conditions in mind, I have provided material, in strip form, for facing bottle caps, in which one surface of the strip is provided with a firmly adherent, continuous thin facing of gutta-percha, thus avoiding all necessity for assembling strips of facing material and of gutta-percha tissue preparatory to their use in the bottle cap facing machine, and all of the disadvantages growing out of this practice.

In the strip material of my invention, a very thin stratum of gutta-percha is evenly distributed upon one face of a strip of facing material. The gutta-percha is not only firmly bonded to this material, but is forced into the surface grain thereof, and has a smooth surface finish of sufficient thickness to form the desired firm bond between a disk cut from the strip and the material of the cap to which such disk is cemented.

The manner of applying the gutta-percha to the facing strip is such as to ensure substantial uniformity in the condition of the gutta-percha throughout the strip by reason of the fact that those impurities or imperfections resulting from the working of gutta-percha in a mill will develop only along the edges of the facing material, where they may either be removed by trimming wide strips of the material, or will come within the wastage of narrow strips when cutting disks from such strips.

Furthermore, gutta-percha tissue must be of a thickness to have sufficient inherent strength to permit of its being stripped from a roll in a mill for working same, and to admit of its being cut to the desired width and to be handled in the re-winding and the disk applying machines, and during the process of its production it has more or less of a longitudinally extending grain as distinguished from its normal granular formation.

In applying the gutta-percha to the fibrous or metallic facing material in accordance with my invention, the thickness of the gutta-percha is determined solely by that required to secure the desired intermediate stratum of the gutta-percha in the finished cap.

In the application of heat, when bonding the facing material to the cap, when utilizing gutta-percha tissue, a tendency of the gutta-percha is to break up into slightly isolated, small globules, thus interrupting the continuity of the bonding stratum. Whether this is due to irregularities in the surface of the facing strip, or to a shrinkage of the gutta-percha tissue when fused, I have been unable to determine. In the strip of my invention, however, the gutta-percha is thoroughly distributed throughout one face of the facing material, and the above conditions do not develop in the subsequent handling of the strips.

So far as the method of producing the strip is concerned, it is such that the effective distribution of the gutta-percha throughout the entire area of the facing material is assured, and this condition cannot be disturbed as a result of the cutting of disks from this material when in strip form. Furthermore, the gutta-percha surface may be thoroughly inspected while producing the strip material, so that any imperfect product may be discarded before it reaches the disk applying machine.

It is desired to note that the surface of the strip to which the gutta-percha is not applied is always a highly polished surface, whether it be a varnish fibrous material such as paper, or a metal foil, so that the gutta-percha surface will not adhere thereto. By applying the gutta-percha directly to the surface of the paper and firmly bonding it there is no likelihood of difficulties arising as a result of the separation of the gutta-percha from the facing strip during the unwinding operation, either as a result of slight adherence, from suction or otherwise, such as frequently occurs when using the superimposed strips of the facing material and of gutta-percha tissue.

The invention consists primarily in material for facing bottle caps consisting of a facing strip of non-absorbent, gas impervious and acid resisting material, having bonded thereto, throughout one face thereof, a thin surfacing of gutta-percha; and in such other novel characteristics, and in the novel steps and practices of producing same, all as hereinafter set forth and described, and more particularly pointed out in the claims hereto appended.

Referring to the drawing,

Fig. 1 is a diagrammatic showing of the method of producing the facing material of the invention;

Fig. 2 is a longitudinal view, partly in cross section, of a fragmentary portion of said material; and Fig. 3 is a face view thereof with a portion of the facing strip broken away.

Like letters refer to like parts throughout the several views.

In the accompanying drawing, the thickness dimensions are all greatly exaggerated, the thickness of the facing strip being less than five thousandths of an inch, and that of the gutta-percha surfacing, less than two thousandths of an inch.

In the embodiment of the invention shown in the drawing, the facing strip is composed of what is known as express paper which is a hard, tough paper having little absorptive properties. The properties inherent to the paper, however, are such, if properly finished, as to adapt it for use as facing material for bottle caps, although it is extremely difficult to satisfactorily cement such paper to the metal shell or cork cushion of such a closure.

In order to impart to one surface of the paper only the desired properties which will result in this strip presenting toward the contents of a bottle, a surface which is non-absorbent, gas impervious and acid resisting, I give a finish to this surface consisting of a coating of a varnish having the desired properties, and which includes therein resin, China-wood oil, a drier and a plasticizer. This surface finish, in addition to having the properties above described, will also be sufficiently flexible to avoid the formation of cracks, or impart to the paper strip as a whole, a degree of brittleness which might result in the formation of such cracks or seams in the paper as would destroy the surface finish and permit the contents of the bottle to attack the body of the paper.

While express paper is a water finish paper, other similar papers may be used such as sulfite paper or bleached kraft paper.

The varnish finish coating above referred to is indicated at $b$ in the drawing, this coating being very thin, merely sufficient to provide a continuous surface upon one side of the strip. The other side of the paper strip presents the normal finish of the paper, and has firmly bonded thereto a thin coating $c$ of gutta-percha, covering the entire face of the strip and presenting a smooth continuous surface, having a general granular character resulting from the manner of applying same to the paper.

It is obvious that in the handling of the completed strip of facing material the gutta-percha facing $c$ will be incapable of stretch or distortion because of its firm adherence to the non-elastic paper strip $a$. As compared with gutta-percha tissue, the quantity of gutta-percha required to secure the desired bonding action, when assembling the facing disk in a cap, is somewhat reduced.

In cutting disks from a strip of the material, there is no tendency toward mutilation of the gutta-percha by reason of possible drag in the cutting die, and each disk, as delivered from the die to within a cap, will present a continuous uninterrupted gutta-percha surface upon the disk, so as to ensure, by the subsequent application of heat and pressure, a bond between the disk and the cap co-extensive in area with the disk. The method involved in utilizing my invention need not be more fully described herein, since it is more fully disclosed and covered in my issued Patent 1,788,260, granted January 6, 1931.

Since, in applying the gutta-percha to the paper, the condition are such as to completely fill all surface pores, it is obvious that during the bonding action, in the facing machine there is no tendency of the gutta-percha, during and after fusing, leaving exposed, minute openings at any point of the surface of the paper.

By reason of the thinness of the gutta-percha facing $c$, there is no tendency toward the expression of any of the gutta-percha from between the facing disk and the portion of the cap to which it is applied.

The possibility of securing a clean cut by the dies for forming the disks, both as to the paper and as to the gutta-percha facing $c$, ensures an effective bond entirely about the edge of the disk, presenting a continuous barrier of non-absorptive, gas impervious and acid resisting material at the space between the disk and the cap which will effectively prevent the seepage of gas or fluids in a bottle between the disk and the portion of the cap to which it is applied.

In Fig. 1 of the drawing, I have illustrated the method of making the strip material of my invention. In the practice of this method, I use an ordinary mill with its heated rollers $d$ and $e$. Operative in relation to the lower roller $e$ is a backing roller $f$. A strip of the paper or other material $a$ is drawn between the rollers $e$ and $f$ by means of the feed rollers $g$, by which it is passed to a re-wind mechanism indicated at $h$.

The method contemplates the feeding of the strip $a$ between a backing roller $f$, and between one of the heated rolls of a gutta-percha mill $e$, thus applying a thin coating of gutta-percha while hot, to one surface only of the paper strip $a$, the gutta-percha hardening from its exposure to the surrounding temperature before engagement by the feed rollers $g$.

In feeding the strip $a$ in the manner above described, the varnish surface thereof is presented downwardly, this surface having been applied to the paper prior to the feeding of the strip in the mill. In this manner a very thin coating of gutta-percha may be applied to one face of the strip $a$, to which it will firmly adhere while said strip is passing between the rollers $e$ and $f$.

The thickness of the surface coating may be controlled by adjustment of the rollers $d$ and $e$, and also by adjustment of the roller $f$ in relation to the latter. In this manner, the strip $a$ will have applied thereto a surfacing of gutta-percha which will be evenly distributed throughout the entire surface of the strip, and will present a substantially smooth exterior surface, notwithstanding surface irregularities in the paper itself. The smooth polished surface $c$ will avoid any possibility of a surface stratum $c$ adhering to the adjoining stratum $b$ after the strip is re-wound and while it is being unwound in the disk applying machine, since the gutta-percha will not become tacky under normal factory temperatures.

It is preferable to apply the gutta-percha in the manner above described, to wide strips of paper which are cut into narrower strips of the desired width for use with bottle caps of different diameters.

The method described has been found to be applicable to the coating of paper strips with gutta-percha, and it is also applicable to coat metal foil, but in coating foil it is desirable to previously prepare, as by the application of a coating, one surface of the foil to receive the gutta-percha and permit it to adhere thereto with sufficient strength to permit a continuing application of gutta-percha to a strip as required by the method of my invention.

Facing material embodying the invention possesses the advantages that a substantially uniform and complete distribution of the gutta-percha throughout each disk cut from a strip, is assured. The additional labor of associating a strip of gutta-percha tissue and a strip of facing material is avoided, and higher speeds may be attained in the facing disk applying machine. By the method of applying fused gutta-percha to a facing strip, there is considerable saving, not only by the reduction in the amount of gutta-percha required, as compared with the use of gutta-percha tissue, but the preparation of the strips for use in the disk applying machines is very much reduced, and a more uniform quality in the bond between the disks and the caps is also assured.

It is preferable for the bottling of many liquids to employ facing material composed of paper of the general character herein described, as compared with the use of metal foils.

Having described the invention, what I claim as new and desire to have protected by Letters Patent, is:—

1. As a new article of manufacture, material for facing bottle caps consisting of a paper strip, having applied to one surface thereof a surface coating of varnish consisting of resin, China-wood oil, a drier and a plasticizer, whereby said surface of the paper is made non-absorbent, gas impervious and acid resisting, and having bonded thereto, throughout the other surface thereof, a thin surfacing of gutta-percha.

2. As a new article of manufacture, bottle cap liner material in strip form comprising paper having a high gloss and having a coating of varnish on one surface of the paper and bonded to the other surface thereof a coating of gutta percha.

3. As a new article of manufacture, paper having a high gloss and having a coating of varnish on one surface of the paper and a coating of gutta percha on the other surface thereof.

4. As a new article of manufacture, bottle cap spotting material in strip form comprising express paper having a coating of varnish on one surface and bonded to the other surface thereof a coating of gutta percha.

5. As a new article of manufacture, bottle cap spotting material in strip form comprising bleached kraft paper having a coating of varnish on one surface and bonded to the other surface thereof a coating of gutta percha.

6. As a new article of manufacture, laminated bottle cap spotting material in strip form comprising hard, tough paper having relatively low absorptive properties, a coating of resistant varnish on one surface of the paper and bonded to the other surface a coating of heat fusible, waterproof and flexible adhesive.

7. As a new article of manufacture, laminated bottle cap spotting material in strip form comprising hard, tough paper having relatively low absorptive properties, a coating of resistant varnish on one surface of the paper and bonded to the other surface a coating of gutta percha.

8. As a new article of manufacture, highly flexible material in sheet or strip form adapted for the spotting of cushion discs of crown caps with center spots of less diameter than the disc diameter by the mere application of heat and pressure consisting of a continuous layer of material selected from a group consisting of metallic foil and varnish coated tough paper having relatively low absorptive properties, said layer being coated on one side with an exposed continuous layer of waterproof, flexible, and acid resistant adhesive adherent to the foil and adapted to adhere to a cork disc, said adhesive being substantially nontacky at room temperature but fusible upon the application of heat and substantially impervious to moisture whereby spots may be punched from the strip and united to the cushion discs of caps by the mere application of heat and pressure.

9. As a new article of manufacture, highly flexible material in sheet or strip form for the spotting of cushion discs of caps with center spots of less diameter than the disc diameter consisting of a continuous layer of metallic foil coated on one side with an exposed continuous layer of waterproof, flexible, and acid resistant adhesive adherent to the foil and adapted to adhere to a cork disc, said adhesive being substantially non-tacky at room temperature but fusible upon the application of heat and substantially impervious to moisture whereby spots may be punched from the strip and united to the cushion discs of caps by the mere application of heat and pressure.

In witness whereof I have hereunto affixed my signature, this 11th day of December 1929.

ALBIN H. WARTH.